(No Model.)
I. H. FARNHAM.
APPARATUS FOR TESTING ELECTRICAL CIRCUITS.
No. 325,520. Patented Sept. 1, 1885.
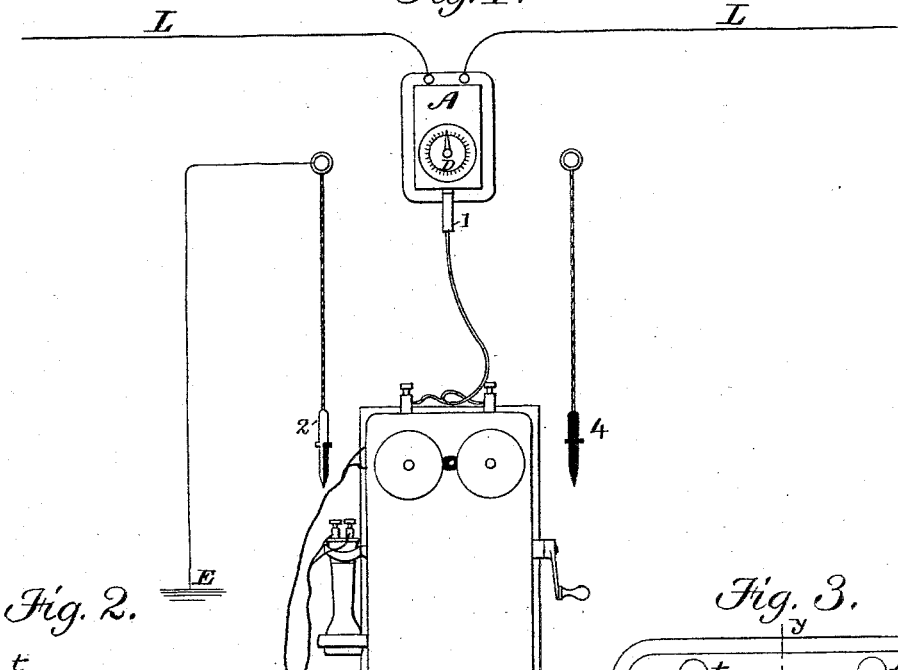
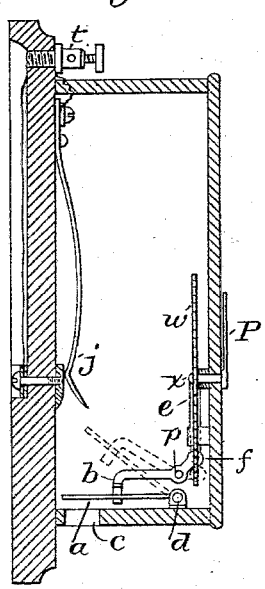
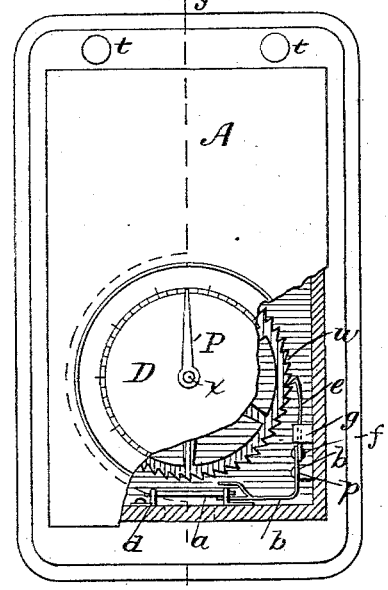
Witnesses.
Geo. Willis Pierce
Wm. B. Vansize
Inventor:
Isaiah H. Farnham

UNITED STATES PATENT OFFICE.

ISAIAH H. FARNHAM, OF BOSTON, MASSACHUSETTS, ASSIGNOR TO THE AMERICAN BELL TELEPHONE COMPANY, OF SAME PLACE.

APPARATUS FOR TESTING ELECTRICAL CIRCUITS.

SPECIFICATION forming part of Letters Patent No. 325,520, dated September 1, 1885.

Application filed January 16, 1885. (No model.)

*To all whom it may concern:*

Be it known that I, ISAIAH H. FARNHAM, residing at Boston, in the county of Suffolk and State of Massachusetts, have invented certain Improvements in Apparatus for Testing Electrical Circuits, of which the following is a specification.

My invention consists of apparatus to facilitate the operation, maintenance, and testing of electrical circuits.

The object of the invention is to simplify and render certain those changes in the normal condition of an electrical circuit necessary in the process of testing for faults, to the end that such changes may be made by inexpert and uninitiated employés; and, further, to furnish an indication or record of the number of such changes.

In the process of telephonic communication upon lines of considerable extent it is desirable to provide test-stations at intermediate points, and it is also desirable that the telephonic instruments located at said stations be normally out of circuit. When faults occur upon the circuit, it is customary to order these stations into circuit or to make certain other changes in the normal condition at such station—as to open the circuit or to ground it. These changes are few in number and may be of a predetermined character. It is inexpedient to keep skilled employés at these stations in every instance, and when such changes are to be made under the direction of a distant station it is very desirable that the necessary manipulation be of the simplest character—as the insertion of a plug, which may be characteristically numbered or marked, into a spring-jack. For this purpose I place a spring-jack of any ordinary or well-known construction in the circuit, and provide a series of plugs, one of which, when inserted, will introduce the telephone-instruments into circuit. A second plug of similar form has one side connected to ground, and a third and similar plug is of insulating material, and when inserted will open the wire. These plugs, being characteristically numbered, the testing-station can obtain the desired change by instructing the way-station to insert plug 1, 2, or 3, as the case may be. In some instances employés at test-stations are compensated by the number of times they are called upon, and it is also desirable to keep a record or indication of the number of times they place their telephonic instruments in the circuit, that the use thereof may be regulated. For this purpose I provide an indicating mechanism—as a scale and pointer—operated step by step by the insertion of one of the plugs, as described, other variation in the indication or registry of which indicator is put out of the control of the said employé by the use of an inclosing-case, lock, and key.

The accompanying sheet of drawings illustrates my invention.

Figure 1 shows the indicator and spring-jack, with its inclosing-case, the telephone-set connected into circuit, grounding and disconnecting plugs being in close proximity. Fig. 2 is a sectional view of the indicator-box on line $y\ y$, Fig. 3; and Fig. 3 is a plan view of the said box, with parts broken away, to show a portion of the interior mechanism.

In Fig. 2, $j$ is a spring-jack electrically connected with the terminals $t\ t$, which receive also the opposite terminals of the line-wire L.

In Fig. 1 I is a double conducting-plug. It is composed of two strips of conducting material separated by a strip of insulating material. These conducting-strips are connected to the opposite terminals of the telephone-set T, and when the plug is inserted in the jack the telephone is placed in circuit. This plug may be marked I, and when it is desired to communicate telephonically with the station in question said station may be requested to insert plug I. It is of course to be understood that these stations may be provided with other means of communicating with the station from which orders are received, usually one of the terminal stations—as by a local wire. 2 is a plug of the same size and shape as plug I. One side is, however, of insulating material, and the other of conducting material, which is connected to earth. By placing this plug in the jack it will open the circuit on one side of the station and ground the other side, depending upon which face of said plug is toward the operator. The plug is provided with marks upon both faces, differing from each other. One face may be "2" the other "3," so that the employé receiving orders to insert plug 2 will insert the plug in question with its face 2 out, and when properly instructed will insert the same plug with face 3 out.

4 is a plug of insulating material the same size and shape, and when inserted completely opens the circuit by disconnecting the line-terminals with respect to each other. Every insertion of a plug in the manner described is made through an aperture, *c*, in the bottom of case A, as shown in Figs. 1 and 2.

Referring to Fig. 2, *c* is the aperture and *a* is a lever or plate covering the aperture *c* and pivoted at *d*. The forked end of the angular lever *b* embraces this lever. Lever *b* is pivoted at *p*. *e* is a pawl sliding in the guide *g* and pivoted to lever *b* at *f*. The hooked end of pawl *e* takes into the teeth of wheel *w*, which is upon an arbor, *x*, as is also the pointer P of the dial D. When a plug is inserted through the aperture *c*, lever *a* and lever *b* are moved into position. (Shown by dotted lines in Fig. 2.) This draws pawl *e* down sufficiently to rotate wheel *w* one notch, carrying arbor *x*, and with it pointer P one space of the dial D. When the plug is withdrawn, the parts resume their normal position, and every insertion of a plug operates in the same way to move the pointer one space, so that the number indicated by the pointer shows how many times the normal condition of the line has been varied. The station giving the instructions and the station receiving the same should keep documentary records, both of which must coincide with the indication of the dial and pointer.

A pencil fixed in the arm P and a paper dial would make a permanent record, and in some cases would be preferable. I consider this an equivalent for the dial and pointer shown.

Telegraph-instruments may be substituted for the telephone-instruments shown.

What I claim, and desire to secure by Letters Patent, is—

1. At a station equipped for electrical communication, the combination of a main line, a spring jack or switch, a set of instruments for electrical communication, and a series of plugs, one of which plugs has two insulated terminals connected to the opposite terminals of the communicating instruments, respectively, a second plug connected to ground, and a third plug composed of insulating material for inserting the instruments with respect to the line, grounding the line, and opening the line, respectively, each plug having characteristic marks or designations.

2. At a station arranged for testing a main line, the combination of a spring jack or switch in the main-line circuit, a series of plugs therefor, and an indicator or recorder operated step by step by a pawl and ratchet, all arranged and operating substantially as described.

3. At a station located upon an electrical circuit, a case or box containing a spring jack or switch electrically connected into the line circuit, an indicator or recorder operated step by step by a pawl and ratchet, and a mechanical connection with the pawl and ratchet covering the approach to the spring jack or switch, and operated by the insertion of a plug with respect to said spring jack or switch.

4. At a station arranged for testing or communicating, a main line the terminals of which are inclosed within a box or case and are normally connected together, a series of plugs or electrical connections for varying the normal condition of the said circuit, and an indicator or recorder for registering a change or variation in the normal condition of the circuit produced by the insertion of a plug.

5. The combination, at a telephone-station, of a telephone-set the opposite terminals of which are connected to the opposite terminals of a double conducting-plug, respectively, a second plug, similar in form and size, one face of which is electrically connected to earth, a third plug, similar in form and size, composed entirely of insulating material, a main line the divided terminals of which are normally in electrical connection through a spring jack, an indicator composed of a dial and pointer operated step by step by a ratchet and pawl, a box or case inclosing the spring-jack and indicator and having an aperture which is covered by a mechanical connection with said pawl controlling the approach to the spring-jack, whereby the insertion of a plug with respect to the case and spring-jack will operate the indicator.

6. At a station equipped for telephonic communication, the combination of a telephone, an indicator or recorder, a switching device by means of which the telephone may be inserted and withdrawn with respect to the main line, a door or cover controlling the approach to the said switching device, and a mechanical connection between the said door or cover and the indicator, whereby the movement of the door or cover will operate the indicator, substantially as described.

In testimony whereof I have signed my name to this specification, in the presence of two subscribing witnesses, this 14th day of January, 1885.

ISAIAH H. FARNHAM.

Witnesses:
WM. B. VANSIZE,
GEO. WILLIS PIERCE.